United States Patent
Yun et al.

(10) Patent No.: US 6,724,553 B2
(45) Date of Patent: Apr. 20, 2004

(54) METHOD AND APPARATUS FOR GENERATING THE OPTIMUM READ TIMING FOR READ AND WRITE OFFSET OF A MAGNETO RESISTIVE HEAD

(75) Inventors: Jong Yun Yun, Santa Clara, CA (US); Kang Seok Lee, San Jose, CA (US); Sang Hoon Chu, Santa Clara, CA (US); Gyu Tack Kim, Santa Clara, CA (US)

(73) Assignee: Samsung Electronics Co., Ltd. (KR)

( * ) Notice: Subject to any disclaimer, the term of this patent is extended or adjusted under 35 U.S.C. 154(b) by 291 days.

(21) Appl. No.: 10/037,783

(22) Filed: Oct. 22, 2001

(65) Prior Publication Data

US 2002/0135915 A1 Sep. 26, 2002

Related U.S. Application Data

(60) Provisional application No. 60/279,136, filed on Mar. 26, 2001.

(51) Int. Cl.[7] .................................................. G11B 5/09
(52) U.S. Cl. ............................................. 360/51; 360/31
(58) Field of Search ............................... 360/46, 51, 31, 360/49, 78.14, 61, 63, 62, 77.02, 78.04; 369/47.28, 124.08, 59.19

(56) References Cited

U.S. PATENT DOCUMENTS

| 3,834,392 A | 9/1974 | Lampman et al. |
| 4,343,300 A | 8/1982 | Hattori |
| 4,499,895 A | 2/1985 | Takayama |
| 4,572,198 A | 2/1986 | Condrington |
| 4,573,452 A | 3/1986 | Greenberg |
| 4,601,705 A | 7/1986 | McCoy |
| 4,621,618 A | 11/1986 | Omagari |
| 4,633,304 A | 12/1986 | Nagasaki |
| 4,672,963 A | 6/1987 | Barken |

(List continued on next page.)

FOREIGN PATENT DOCUMENTS

EP 0079524 A1 5/1983

*Primary Examiner*—Alan T. Faber
(74) *Attorney, Agent, or Firm*—Irell & Manella LLP; Jeffrey P. Aiello

(57) ABSTRACT

A method for writing and reading data in a hard disk drive and compensating for an offset between a write element and a read element of a head. The method determines an offset time by determining the difference between a desired sync byte position and an actual sync byte position located between a preamble and a data sector of the disk. The difference corresponds to the offset between the read and write elements. The offset time is subtracted from the normal time for enabling the read gate of a disk drive pre-amplifier.

47 Claims, 5 Drawing Sheets

U.S. PATENT DOCUMENTS

| | | |
|---|---|---|
| 4,758,222 A | 7/1988 | McCoy |
| 4,785,806 A | 11/1988 | Deckelbaum |
| 4,788,975 A | 12/1988 | Shturman et al. |
| 4,790,813 A | 12/1988 | Kensey |
| 4,802,033 A | 1/1989 | Chi |
| 4,875,897 A | 10/1989 | Lee |
| 4,887,605 A | 12/1989 | Angelsen et al. |
| 4,974,607 A | 12/1990 | Miwa |
| 4,982,295 A | 1/1991 | Yakuwa et al. |
| 4,996,975 A | 3/1991 | Nakamura |
| 5,078,714 A | 1/1992 | Katims |
| 5,104,392 A | 4/1992 | Kittrell et al. |
| 5,125,888 A | 6/1992 | Howard et al. |
| 5,170,299 A | 12/1992 | Moon |
| 5,203,781 A | 4/1993 | Bonati et al. |
| 5,217,001 A | 6/1993 | Nakao et al. |
| 5,217,003 A | 6/1993 | Wilk |
| 5,217,453 A | 6/1993 | Wilk |
| 5,228,429 A | 7/1993 | Hatano |
| 5,233,482 A | 8/1993 | Galbraith et al. |
| 5,235,478 A | 8/1993 | Hoshimi et al. |
| 5,259,365 A | 11/1993 | Nishikori et al. |
| 5,268,803 A | 12/1993 | Sugita et al. |
| 5,274,510 A | 12/1993 | Sugita et al. |
| 5,301,080 A | 4/1994 | Ottesen et al. |
| 5,335,121 A | 8/1994 | Bombeeck |
| 5,335,123 A | 8/1994 | Shimizu et al. |
| 5,367,409 A | 11/1994 | Ottesen et al. |
| 5,368,015 A | 11/1994 | Wilk |
| 5,384,671 A | 1/1995 | Fisher |
| 5,388,127 A | 2/1995 | Scarpa |
| 5,402,280 A | 3/1995 | Supino |
| 5,483,393 A | 1/1996 | Mento et al. |
| 5,497,111 A | 3/1996 | Cunningham |
| 5,500,776 A | 3/1996 | Smith |
| 5,523,899 A | 6/1996 | Parken et al. |
| 5,539,714 A | 7/1996 | Andrews, Jr. et al. |
| 5,566,101 A | 10/1996 | Kodra |
| 5,581,420 A | 12/1996 | Chainer et al. |
| 5,587,850 A | 12/1996 | Ton-that |
| 5,590,154 A | 12/1996 | Forni et al. |
| 5,606,469 A | 2/1997 | Kosugi et al. |
| 5,608,587 A | 3/1997 | Smith |
| 5,615,058 A | 3/1997 | Chainer et al. |
| 5,715,105 A | 2/1998 | Katayama et al. |
| 5,781,133 A | 7/1998 | Tsang |
| 5,822,143 A | 10/1998 | Cloke et al. |
| 5,844,920 A | 12/1998 | Zook et al. |
| 5,862,007 A | 1/1999 | Pham et al. |
| 5,898,532 A | 4/1999 | Du et al. |
| 5,905,601 A * | 5/1999 | Tsunoda ............... 360/51 |
| 5,961,658 A | 10/1999 | Reed et al. |
| 5,986,847 A | 11/1999 | Le et al. |
| 6,094,316 A | 7/2000 | Pham et al. |

* cited by examiner

METHOD AND APPARATUS FOR GENERATING THE OPTIMUM READ TIMING FOR READ AND WRITE OFFSET OF A MAGNETO RESISTIVE HEAD

REFERENCE TO PROVISIONAL APPLICATION

This application is based on U.S. Provisional Application No. 60/279,136, filed on Mar. 26, 2001.

BACKGROUND OF THE INVENTION

1. Field of the Invention

The present invention relates to reading data in a disk drive and compensating for an offset between a read element and a write element of a head.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic fields of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided up into a number of segments. The voice coil motor and actuator arm can move the heads to different tracks of the disks.

FIG. 1 shows a typical sector of a disk. The sector contains a servo address mark (SAM) that provides a sync for a SERVO field. The SERVO field contains servo bits that are used to center the head on the track. A DATA field follows the servo field. The data field typically contains a preamble that is used to phase lock the circuits of the disk drive with the information on the disk.

The head is typically connected to a pre-amplifier circuit that has a read gate and a separate write gate. Enabling the write gate allows information to be written onto the disk through the write element of the head. Enabling the read gate allows information to be read from the disk through the read element.

As shown in FIG. 1, the write gate WG is typically enabled in conjunction with the trailing edge of a SECTOR signal. The preamble and data are then written onto the disk. There are typically multiple DATA sectors, wherein the process of generating a SECTOR signal and writing data is repeated. The SECTOR signals are typically generated at predetermined time intervals after the detection of the SAM signal. When reading the data the read gate RG is enabled at approximately the trailing edge of the sector signal.

The write element is typically offset from the read element of an MR head. Consequently, some of the preamble is actually written prematurely so that the read element misses a portion of the preamble during a read routine. The preamble is used to phase lock the circuits of the disk drive to allow for proper reading of the data in the subsequent DATA sector(s). Without a sufficient amount of preamble to read, the disk drive may not acquire proper phase lock. A lack of phase lock may cause errors in reading the data. This problem can be alleviated by increasing the length of the preamble so that there is enough preamble data to allow phase lock. Unfortunately, stretching the preamble reduces the storage capacity of the disk drive.

BRIEF SUMMARY OF THE INVENTION

A hard disk drive that includes a head coupled to a disk. The head includes a read element offset from a write element. The drive further includes electrical circuits that enable the read element as a function of the offset.

DETAILED DESCRIPTION

Disclosed is a method for writing and reading data in a hard disk drive and compensating for an offset between a write element and a read element of a head. The method determines an offset time by determining the difference between a desired sync byte position and an actual sync byte position located between a preamble and a data sector of the disk. The difference corresponds to the offset between the read and write elements. The offset time is subtracted from the normal time for enabling the read gate of a disk drive pre-amplifier.

Figure 2:
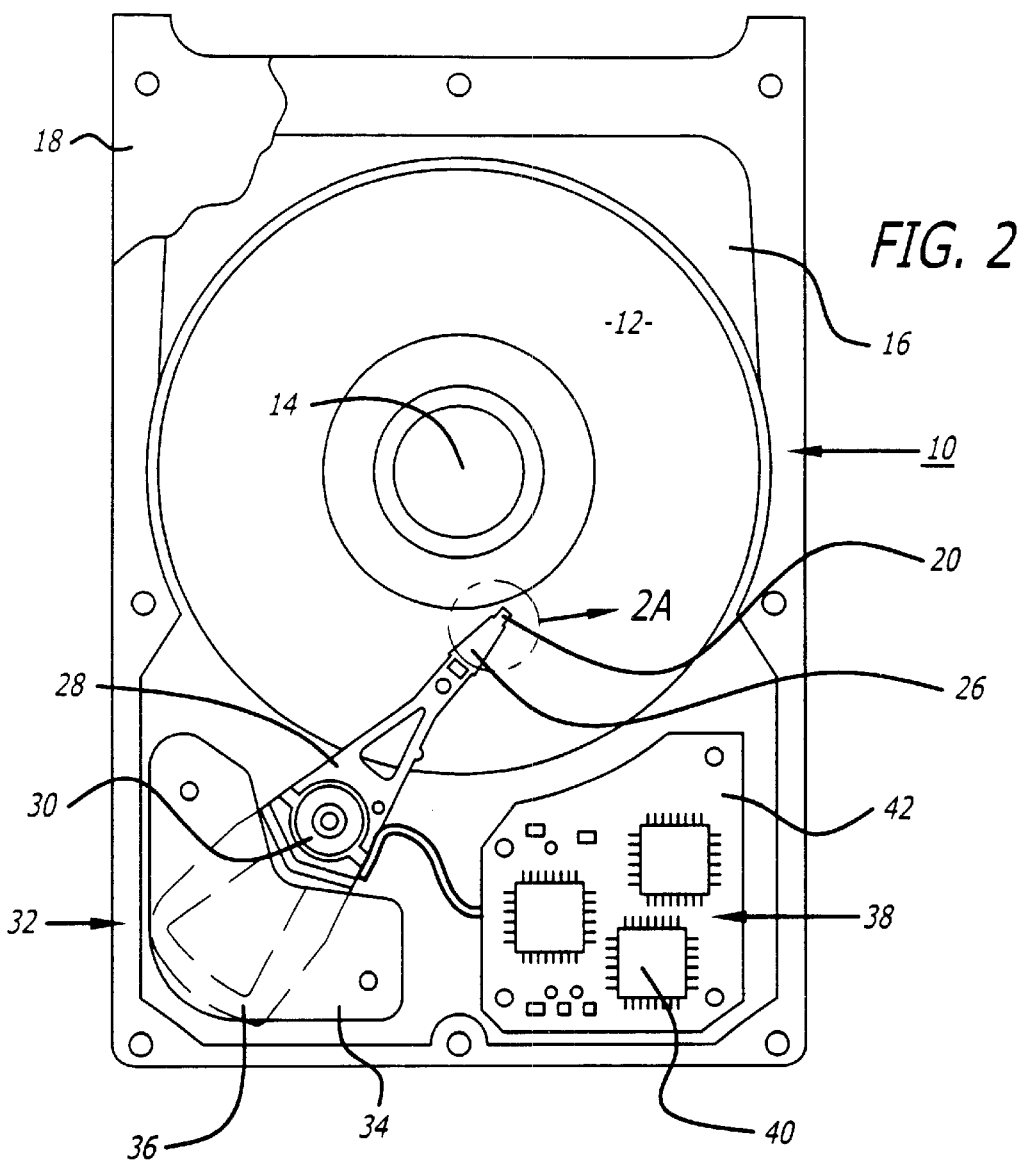
FIG. 2 is a top view of an embodiment of a hard disk drive of the present invention.

Referring to the drawings more particularly by reference numbers, FIG. 2 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2A:
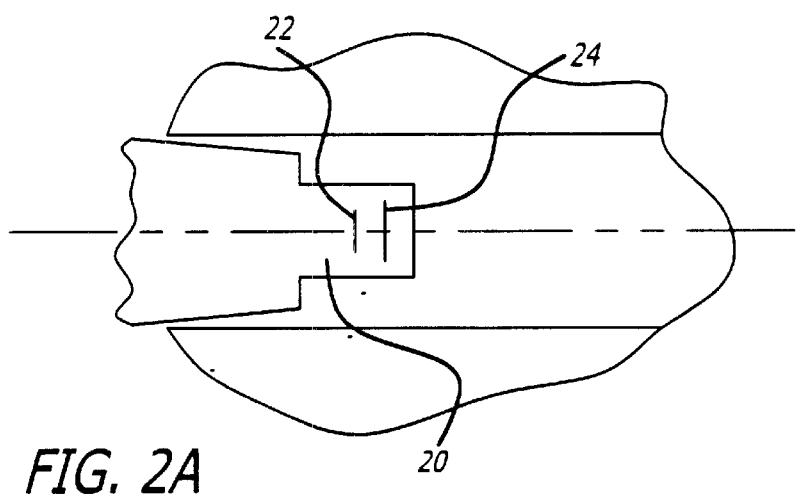
FIG. 2A is a top enlarged view of a head of the hard disk drive.

The disk drive 10 may include a plurality of heads 20 located adjacent to the disks 12. As shown in FIG. 2A the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 2, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
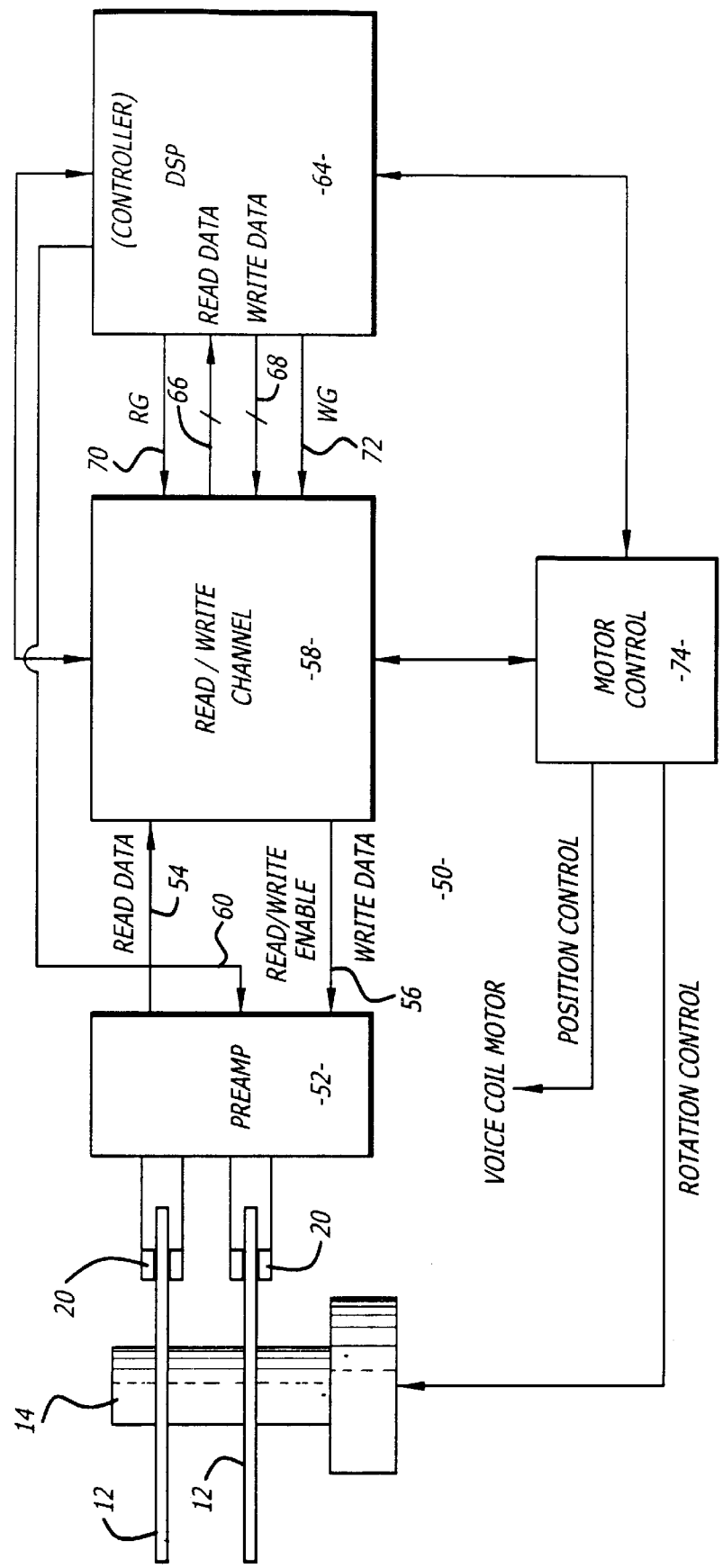
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10.

Figure 1:
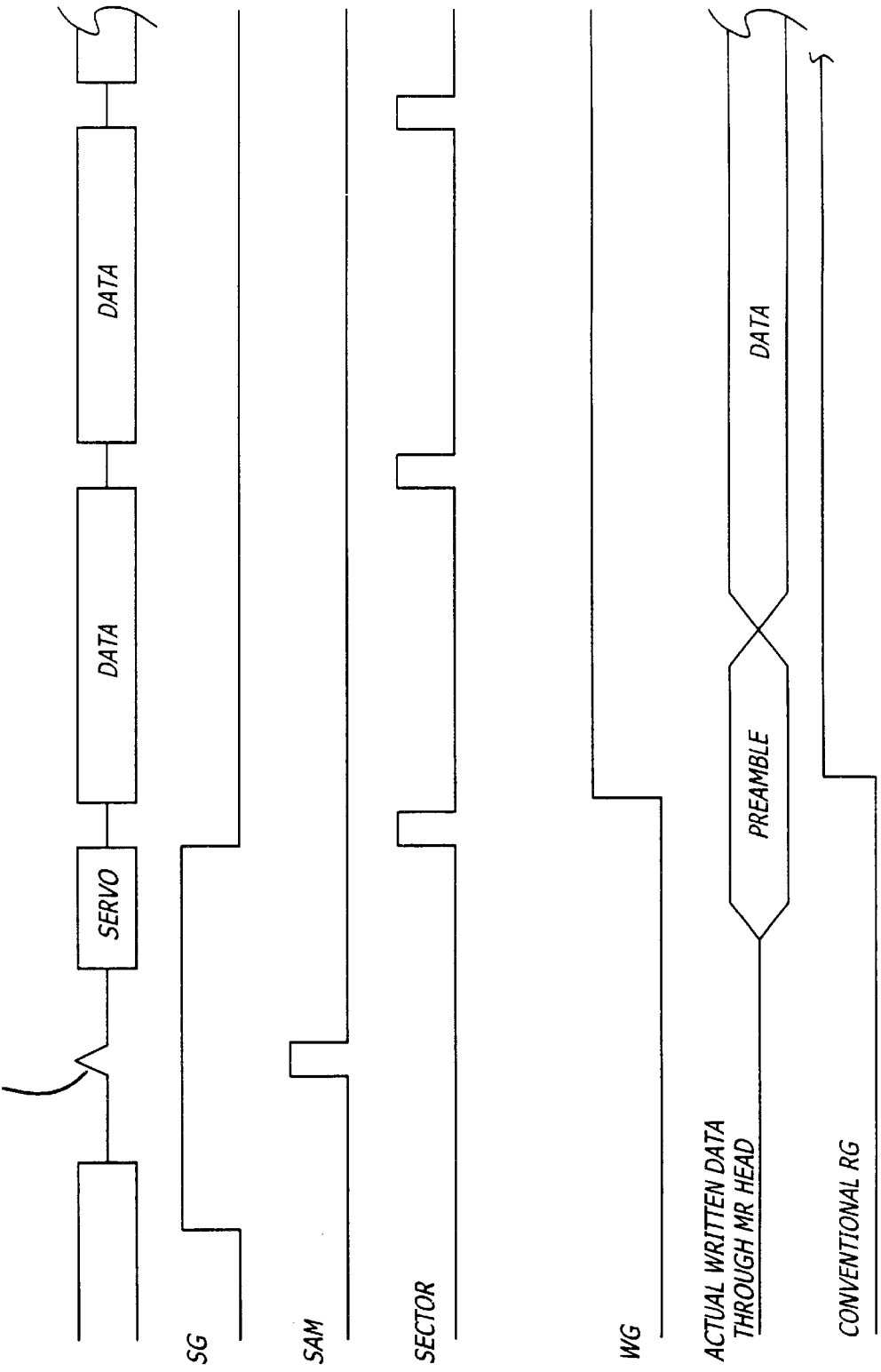
FIG. 1 is a schematic and timing diagram showing the writing and reading of data in a disk drive of the prior art.
Figure 4:
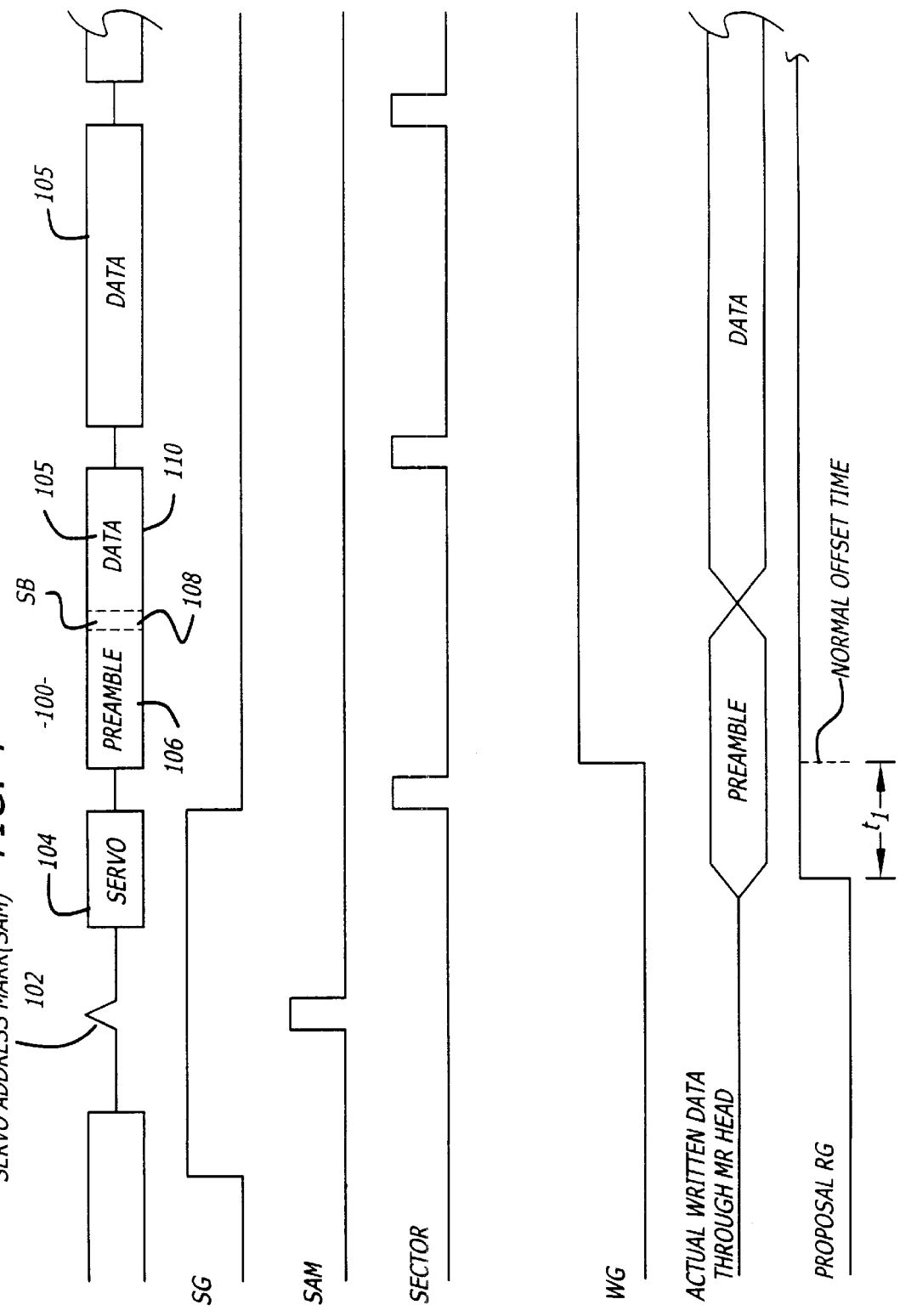
FIG. 4 is a schematic and timing diagram for the writing and reading of data in the disk drive.

FIG. 4 shows a track segment 100 and corresponding timing signals for writing and reading data in the disk drive 10. The segment 100 includes a servo address mark (SAM) 102, a SERVO field 104 and a plurality of DATA fields 105. Each DATA field 105 includes a PREAMBLE 106, a sync byte (SB) 108 and a DATA sector 110. A SECTOR signal is generated at predetermined intervals after the reading of the SAM signals. These fields and signals are found in the prior art as shown in FIG. 1.

The write gate WG can be enabled at the trailing edge of the SECTOR signal wherein preamble data, the sync byte SB and data are written onto the disk. Because the write element is offset from the read element, a portion of the PREAMBLE is actually written prematurely. The PREAMBLE allows the read/write channel to phase lock onto the data in the DATA sector.

To insure that all of the preamble data is properly read and the read/write channel acquires phase lock, the read gate is enabled a predetermined time interval before the SECTOR signal. This time interval will be referred to as the offset time $t_1$. The time at which the read gate is enabled is determined by subtracting the offset time from a normal or non-offset time shown in phantom in FIG. 4. The early enablement of the read gate allows all of the PREAMBLE to be read and allow phase lock and subsequent reading of data in the data sector.

Figure 5:
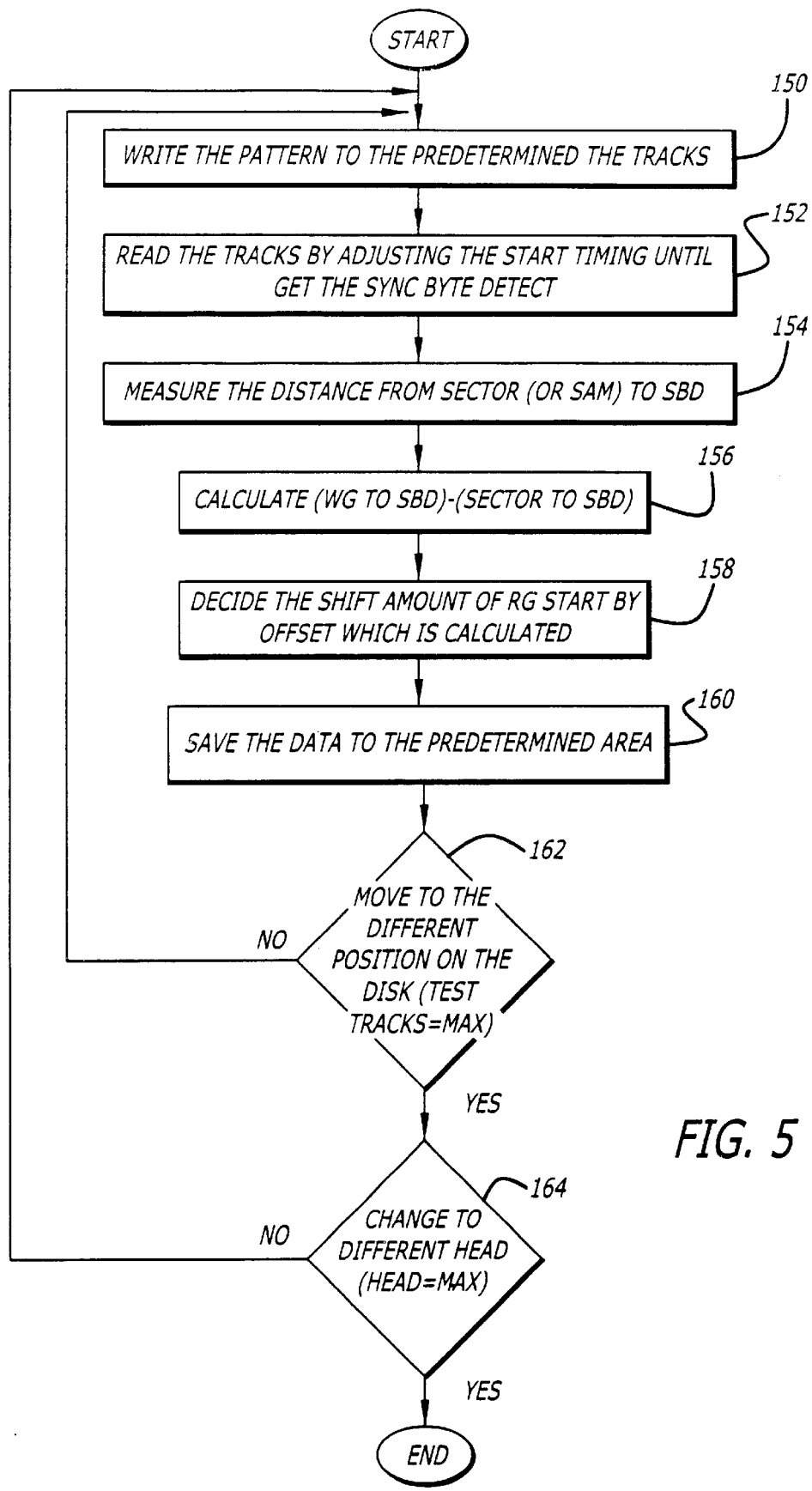
FIG. 5 is a flowchart showing the determination of an offset in a head of the disk drive.

FIG. 5 shows a flowchart for determining the offset time. The time interval $t_2$ between the SECTOR signal and the sync byte for a desired sync byte location is already known given the parameters of the disk drive. In process block 150 the preamble, sync byte and data are written onto the disk. In block 152, the start time of the read gate is adjusted until the read/write channel can lock and read the sync byte. The time interval $t_3$ between the SECTOR signal and the sync byte is determined in block 154. The timing differential $t_2-t_3$ between the desired sync position and the actual sync position is computed in processing block 156.

The offset time $t_1$ used to shift the read gate RG during operation is computed in block 158 based on the timing differential $t_2-t_3$. In block 160, the offset time is stored in memory, typically on the disk(s). In decision block 162 the head 20 is moved to an adjacent track where steps 150–160 are repeated, unless the head 20 is at the last track. In decision block 162, steps 150–162 are repeated for a different head unless all of the heads have been processed.

The offset times for each head and each track can be stored in memory and then retrieved by the controller to shift the enablement of the read gate RG to insure that the entire PREAMBLE is read and the read/write channel acquires phase lock for subsequent data retrieval.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, although the offset was determined by measuring the time interval between the sync byte and SECTOR signal, the actual and desired position of the sync byte may be referenced from the SAM signal.

What is claimed is:

1. A hard disk drive, comprising:

a disk;

a spindle motor coupled to said disk;

a head coupled to said disk, said head having a read element that is separated from a write element by an offset; and, an electrical circuit that enables said read element as a function of the offset.

2. The disk drive of claim 1, wherein said disk includes a sync byte, the offset is related to a difference between a desired sync byte location and an actual sync byte location.

3. The disk drive of claim 2, wherein the sync byte location is measured from a sector signal.

4. The disk drive of claim 2, wherein the sync byte location is measured from a sync address mark located on said disk.

5. The disk drive of claim 1, wherein said electrical circuit includes a pre-amplifier circuit connected to said head, a read/write channel connected to said pre-amplifier circuit and a controller connected to said read/write channel and said pre-amplifier, said pre-amplifier circuit having a read gate coupled to said read element of said head.

6. The disk drive of claim 1, wherein the information relating to the offset is stored on said disk.

7. The disk drive of claim 2, wherein said disk includes a data sector and a preamble to said data sector, said sync byte being located between said data sector and said preamble.

8. A hard disk drive, comprising:

a disk that has a sync address mark, a data sector, a preamble to said data sector, and a sync byte located between said preamble and said data sector;

a spindle motor coupled to said disk;

a head coupled to said disk, said head having a read element that is separated from a write element by an offset;

a pre-amplifier circuit connected to said head, said pre-amplifier circuit having a read gate coupled to said read element;

a read/write channel circuit connected to said pre-amplifier circuit; and, a controller connected to read/write channel circuit and said pre-amplifier circuit, said controller provides a read gate signal to said read gate to enable said read element, a timing of said read gate signal being a function of the offset.

9. The disk drive of claim 8, wherein the offset is determined from a desired sync byte location and an actual sync byte location.

10. The disk drive of claim 9, wherein the actual sync byte is measured from the sync address mark.

11. The disk drive of claim 9, wherein the actual sync byte is measured from a sector signal.

12. The disk drive of claim 11, wherein the read gate signal is generated in accordance with a difference between a non-offset time of the read gate signal and the offset time.

13. A hard disk drive, comprising:
a disk;
a spindle motor coupled to said disk;
a head coupled to said disk, said head having a read element that is separated from a write element by an offset; and,
circuit means for enabling said read element as a function of the offset.

14. The disk drive of claim 13, wherein said disk includes a sync byte, the offset is related to a difference between a desired sync byte location and an actual sync byte location.

15. The disk drive of claim 14, wherein the sync byte location is measured from a sector signal.

16. The disk drive of claim 14, wherein the sync byte location is measured from a sync address mark located on said disk.

17. The disk drive of claim 13, wherein said circuit means includes a pre-amplifier circuit connected to said head, a read/write channel connected to said pre-amplifier circuit and a controller connected to said read/write channel and said pre-amplifier, said pre-amplifier circuit having a read gate coupled to said read element of said head.

18. The disk drive of claim 13, wherein the information relating to the offset is stored on said disk.

19. The disk drive of claim 14, wherein said disk includes a data sector and a preamble to said data sector, said sync byte being located between said data sector and said preamble.

20. A hard disk drive, comprising:
a disk that has a sync address mark, a data sector, a preamble to said data sector, and a sync byte located between said preamble and said data sector;
a spindle motor coupled to said disk;
a head coupled to said disk, said head having a read element that is separated from a write element by an offset;
a pre-amplifier circuit connected to said head, said pre-amplifier circuit having a read gate coupled to said read element;
a read/write channel circuit connected to said pre-amplifier circuit; and,
controller means for providing a read gate signal to said read gate to enable said read element, a timing of said read gate signal being a function of the offset.

21. The disk drive of claim 20, wherein an offset time is determined from a desired sync byte location and an actual sync byte location.

22. The disk drive of claim 21, wherein the actual sync byte is measured from the sync address mark.

23. The disk drive of claim 21, wherein the actual sync byte is measured from a sector signal.

24. The disk drive of claim 21, wherein the read gate signal is generated in accordance with a difference between a non-offset time of the read gate signal and the offset time.

25. A method for enabling a read gate of a hard disk drive, comprising:

reading a sync address mark of a disk with a head that has a read element offset from a write element;
generating a sector signal; and,
enabling a read gate signal at a time that is a function of the offset.

26. A method to determine an offset between a read element and a write element of a hard disk drive, comprising:
determining a desired sync byte location on a disk;
reading a disk with a head that has a read element;
determining an actual sync byte location of the disk; and,
generating offset information as a difference between the desired and actual sync byte locations.

27. The method of claim 26, further comprising storing the offset information onto the disk.

28. The method of claim 26, wherein the actual sync byte position is measured from a sync address mark.

29. The method of claim 26, wherein the actual sync byte position is measured from a sector signal.

30. The method of claim 26, wherein the sync byte is located between a data sector and a preamble of said data sector.

31. The method of claim 26, further comprising using the offset information to enable a read gate.

32. A circuit that controls a read/write operation of a data storage device that has a read element and a write element that are physically offset from each other, comprising:
a controller that generates a periodic timing reference signal, a read gate signal that precedes in time said periodic timing reference signal and indicates a start of a read operation, and a write gate signal that is subsequent in time to said periodic timing reference signal by an offset duration and indicates a start of a write operation.

33. The circuit according to a claim 32, wherein said offset duration corresponds to said physical offset between said read element and said write element.

34. The circuit according to claim 32, wherein said controller further generates a write gate signal that is subsequent in time to said periodic timing reference signal and indicates a start of a write operation.

35. The circuit of claim 32, wherein said periodic timing reference signal is a SECTOR signal.

36. A data storage device, comprising:
a storage medium;
a head coupled to said storage medium, said head having a read element that is physically offset from a write element;
a controller that generates a periodic timing reference signal, a read gate signal that precedes in time said periodic timing reference signal and indicates a start of a read operation, and a write gate signal that is subsequent in time to said periodic timing reference signal by an offset duration and indicates a start of a write operation.

37. The data storage device according to claim 36, wherein said offset duration corresponding to said physical offset between said read element and said write element.

38. The data storage device of claim 36, wherein said periodic timing reference signal is a SECTOR signal.

39. A method for controlling the operation of a data storage device that has a read element physically offset from a write element, comprising:
generating a write signal that is subsequent in time to a first periodic timing reference signal to initiate a write operation through the write element; and, generating a read gate signal that precedes in time a second periodic timing reference signal to initiate a read operation through the read element.

40. The method of claim 39, wherein the first and second periodic timing reference signals are SECTOR signals.

41. A circuit that controls a read/write operation of a data storage device that has a read element and a write element that are physically offset from each other, comprising:

a controller that generates a periodic timing reference signal, and a read gate signal that indicates a start of a read operation, said read gate signal being offset in time from the periodic timing reference signal by a duration that corresponds to the physical offset between the read element and the write element.

42. The circuit of claim 41, wherein said periodic timing reference signal is a SECTOR signal.

43. A method for controlling the read/write operation of a data storage device that has a read element and a write element that are physically offset from each other, comprising:

generating a write signal that is subsequent in time to a first periodic timing reference signal by an offset duration to initiate a write operation through the write element; and, generating a read gate signal that precedes in time a second periodic timing reference signal to initiate a read operation through the read element.

44. The method of claim 43, wherein the first and second periodic timing reference signals are SECTOR signals.

45. A method of compensating for a physical offset between a read element and a write element of a data storage device, comprising:

writing a data pattern onto a storage medium, the data pattern including a preamble portion that has a start point;

determining a time duration between the start point of the preamble and a periodic timing reference signal; and, offsetting at least one of a read gate signal and a write gate signal from said periodic timing reference signal by said determined time duration, said read gate signal indicating a start of a read operation, said write gate signal indicating a start of a write operation.

46. The method of claim 45, wherein the time duration is stored onto the storage medium.

47. The method of claim 45, wherein said time duration is determined by determining a time length of said preamble portion, determining a rear time duration, said rear time duration being a time difference between said periodic timing reference signal and an end of said preamble portion, and subtracting said rear time duration from said time length to arrive at said time duration.

* * * * *